United States Patent
Ogata

(10) Patent No.: US 7,609,690 B2
(45) Date of Patent: Oct. 27, 2009

(54) NETWORK SYSTEM, COMMUNICATION METHOD FOR USE IN NETWORK SYSTEM AND HOST DEVICE

(75) Inventor: Hideaki Ogata, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 627 days.

(21) Appl. No.: 11/197,519

(22) Filed: Aug. 5, 2005

(65) Prior Publication Data

US 2006/0029047 A1    Feb. 9, 2006

(30) Foreign Application Priority Data

Aug. 5, 2004    (JP)    ............... P2004-228940

(51) Int. Cl.
H04L 12/28    (2006.01)
H04L 12/56    (2006.01)

(52) U.S. Cl. ............... 370/389; 370/473; 370/474

(58) Field of Classification Search ............... 370/238, 370/220, 389
See application file for complete search history.

(56) References Cited

U.S. PATENT DOCUMENTS 6,119,157 A * 9/2000 Traversat et al. ............ 709/220
6,564,337 B1 5/2003 Yoneda et al.
6,961,336 B2 * 11/2005 Coggeshall ............... 370/389
6,982,953 B1 * 1/2006 Swales ............... 370/218
2002/0041568 A1 * 4/2002 Bender ............... 370/238

FOREIGN PATENT DOCUMENTS

| JP | 10-200526 A | 7/1998 |
| JP | 11-355303 A | 12/1999 |
| JP | 2000-222149 A | 8/2000 |
| JP | 2001-101109 A | 4/2001 |
| JP | 2001-326656 A | 11/2001 |

OTHER PUBLICATIONS

IETF Networking Working Group RFC 2131 Mar. 1997 Dynamic Host Configuration Protocol R. Droms.*

* cited by examiner

*Primary Examiner*—Dang T Ton
*Assistant Examiner*—Frederick Ott
(74) *Attorney, Agent, or Firm*—Sughrue Mion, PLLC

(57) ABSTRACT

A host device connected to a network includes a storage unit configured to store first identification information dynamically assigned to a device connected to the network and second identification information unique to the device, and an updating unit acquiring the first identification information and the second identification information from the device and updating the first identification information stored in the storage unit with the acquired first identification information based on the acquired second identification information.

4 Claims, 4 Drawing Sheets

NETWORK SYSTEM, COMMUNICATION METHOD FOR USE IN NETWORK SYSTEM AND HOST DEVICE

BACKGROUND OF THE INVENTION

The present invention relates to an art for communication in an environment where identification information dynamically changes in a network, and more particularly, to an art for enabling communication by following a change in identification information even when no name server is available.

In a network system using a TCP/IP, an IP address is dynamically assigned to a device which is connected to a network by utilization of the art of DHCP (Dynamic Host device Configuration Protocol). In relation to the DHCP, a DHCP server assigns IP addresses to devices which have been connected to the network, in the sequence in which the devices have been connected to the network. When the device assigned a particular IP address leaves the network, the DHCP server recovers the IP address assigned to the device and possibly re-uses the IP address by assigning the IP address to another device.

Consequently, when a device having once been assigned an IP address upon connection with the network and having left the network is again connected to the network, the device is not guaranteed to be assigned the same IP address as that assigned previously. When communication is performed by using a TCP/IP, the IP address becomes identification information in the network. Hence, if the IP address is changed, communication cannot be continued unless a newly-assigned IP address is acquired. For instance, in a situation where a host device and a printer are connected to a network, when the IP address of the printer is changed as a result of the power of the printer being turned off and again turned on, the host device cannot perform printing by use of the printer in subsequent operations, unless the host device acquires a new IP address of the printer Therefore, in a widely practiced art, the problem of the address is solved by providing a DNS (Domain Name System) server in the network in order to avoid occurrence of such a situation, by means of following a change in the IP address (e.g., JP-A-11-355303).

In a LAN (Local Area Network) environment of a given scale or larger, even when an attempt is made to solve the problem of addresses by introduction of a DNS server such as that mentioned above, an advantage appropriate to costs incurred by introduction and management can be expected. However, in a LAN environment of extremely small scale, such as that found in an ordinary home, introduction of a name server such as a DNS is not realistic for various reasons, such as introduction costs or a deficiency in network management skills.

SUMMARY

An advantage of the present invention is to provide an art for enabling continual communication without provision of a name server, or the like, in an environment where identification information to be assigned to a device in a network is dynamically changed.

According to an aspect to the invention, a host device connected to a network, comprising:

a storage unit configured to store first identification information dynamically assigned to a device connected to the network and second identification information unique to the device; and an updating unit acquiring the first identification information and the second identification information from the device and updating the first identification information stored in the storage unit with the acquired first identification information based on the acquired second identification information.

In this case, even when first identification information about the object device has been changed, the change can be followed.

It is preferable that the updating unit determines whether the second identification information stored in the storage unit corresponds with the acquired second identification information, and the updating unit updates the first identification information stored in the storage unit with the acquired first identification information based on a result of the determination.

It is preferable that the first identification information is dynamically assigned by an issuance server connected to the network In this case, the dynamic identification information issuance server can dynamically assign first identification information to a device in the network.

It is preferable that when the device is reconnected to the network, the issuance server reassigns first identification information to the device, and the updating unit acquires the reassigned first identification information and the second identification information from the device and updates the first identification information stored in the storage unit with the reassigned first identification information based on the acquired second identification information.

In this case, communication can be continually established with an object device which is reconnected to the network after having once left the same, as well.

It is preferable that the first identification information includes an IP address, and the issuance server includes a Dynamic Host device Configuration Protocol server.

It is preferable that a communication unit configured to communicate with the device by using the first identification information stored in the storage unit.

It is preferable that when the communication unit fails to communicate with the device, the updating unit acquires the first identification information and the second identification information from the device and updates the first identification information stored in the storage unit with the acquired first identification information based on the acquired second identification information.

In this case, the storage unit can be updated only when communication using the first identification information cannot be established.

It is preferable that before the communication unit communicates with the device, the updating unit acquires the first identification information and the second identification information from the device and updates the first identification information stored in the storage unit with the acquired first identification information based on the acquired second identification information.

In this case, the first identification information stored in the storage unit is maintained updated at all times.

It is preferable that the communication unit communicates with the device through first protocol by using the first identification information, and the updating unit acquires the first identification information and the second identification information from the device through second protocol that differs from the first protocol.

In this case, the first and second identification information can be acquired with a second protocol when communication cannot be established with a first protocol using the first identification information.

It is preferable that the first protocol includes a TCP/IP or a UDP/IP, and the second protocol includes a manufacturer unique protocol.

It is preferable that the updating unit transmits inquiry information to a devise connected to the network for confirming an exist of a communicable device with the host device in the network, the updating unit receives response information from the device, the response information including the first identification information and the second identification information of the device, and the updating unit updates the first identification information stored in the storage unit with the first identification information of the response information based on the second identification information of the response information.

It is preferable that the first identification information includes an IP address, the second identification information includes a MAC address, a header of the response information includes the IP address, and a main body of the response information includes the MAC address.

According to an aspect to the invention, a network system connected to a host device and a device, the network system comprising:

a storage unit configured to store first identification information dynamically assigned to the device and second identification information unique to the device; and an updating unit acquiring the first identification information and the second identification information from the device and updating the first identification information stored in the storage unit with the acquired first identification information based on the acquired second identification information.

It is preferable that the updating unit determines whether the second identification information stored in the storage unit corresponds with the acquired second identification information, and the updating unit updates the first identification information stored in the storage unit with the acquired first identification information based on a result of the determination.

It is preferable that the updating unit transmits inquiry information from the host device to a device for confirming an exist of a communicable device with the host device in the network, the updating unit receives response information from the device, the response information including the first identification information and the second identification information of the device, the updating unit determines whether the stored second identification information corresponds with the second identification information of the response information, and the updating unit updates the first identification information stored in the storage unit with the first identification information of the response information based on a result of the determination.

It is preferable that the network system further includes a communication unit communicating with the device by using the updated first identification information.

According to an aspect to the invention, a communication method for a network system connected to a plurality of devices, the method comprising:

storing first identification information dynamically assigned to the device and second identification information unique to the device;

acquiring the first identification information and the second identification information from the device; and updating the first identification information stored in the storage unit with the acquired first identification information based on the acquired second identification information.

It is preferable that the communication method further includes determining whether the second identification information stored in the storage unit corresponds with the acquired second identification information.

It is preferable that the communication method further transmitting inquiry information to the device for confirming an exist of a communicable device with the host device in the network, and receiving response information from the device, the response information including the first identification information and the second identification information of the device.

It is preferable that there is provided a computer-readable recording medium for causing a computer to execute the communication method

DETAIL DESCRIPTION OF PREFERRED EMBODIMENT

Figure 1:
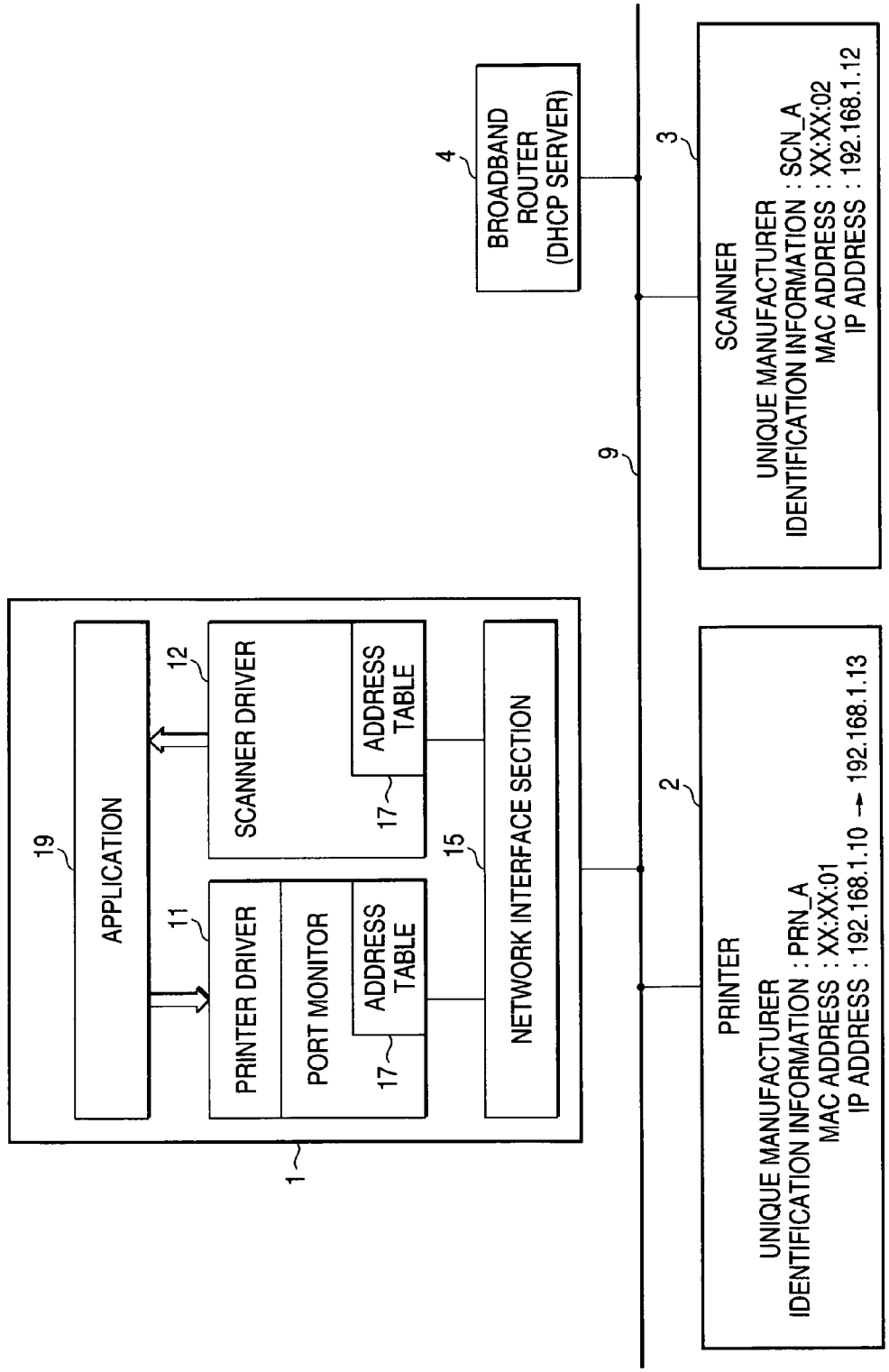
FIG. 1 shows a block diagram of a network system according to an embodiment of the present invention.

A network system according to an embodiment of the present invention will be described hereinbelow by reference to the drawings. FIG. 1 is a view showing a block diagram of a network system according to the embodiment. The present system includes a host device 1, a printer 2 and a scanner 3, which are peripheral devices, and a broadband router 4, and these devices are connected to each other through a network 9.

The printer 2 performs printing upon receipt of a print command from the host device 1. The scanner 3 reads characters or images printed on paper, and outputs image data. Unique identification information is assigned to the printer 2 and the scanner 3, respectively. The unique identification information includes, e.g., a MAC address or identification information unique to each device, imparted by the manufacturer of the device (hereinafter the information will be called "unique manufacturer identification information"). Here, the printer 2 and the scanner 3 are assumed to be manufactured by a single manufacturer.

The broadband router 4 functions as a DHCP server. Specifically, the broadband router 4 dynamically assigns IP addresses to respective devices connected to the network 9. In the embodiment shown in FIG. 1, the host device 1, the printer 2, and the scanner 3 are connected to the network 9, and hence the broadband router 4 dynamically assigns respective IP addresses to these devices. Here, assignment of the IP addresses is performed when the devices 1, 2, and 3 are connected to the network 9. In contrast, when the devices connected to the network leave the network, the broadband router 4 recovers the IP addresses assigned to the devices and becomes able to assign the thus-recovered IP addresses to other devices, When a device having once been connected to the network and assigned an IP address, and having later left the network is again connected to the network, there may arise a case where an IP address differing from the previously-assigned IP address is assigned, by means of the function of such a broadband router 4. At this time, the device that has established communication with the device whose IP address has been changed cannot continually establish communication with the device whose IP address has been changed, unless the device follows the change. For this reason, in the present embodiment, the change in IP address is followed by utilization of an address table 17 of the host device 1. Processing for following the change will be described later.

Connection to the network includes a case where the power supplies of the respective devices 1, 2, and 3 remain turned off and the power supplies of the devices 1, 2, and 3 are turned on while the devices are being physically connected to the network cable, and a case where the power supplies of the respective devices 1, 2, and 3 remain turned on and are then physically connected as a result of network cables being connected into the respective devices 1, 2, and 3. Further, leaving a network includes a case where the network cables are physically pulled out while the respective devices 1, 2, and 3 are connected to the network and a case where the power supplies of the respective devices 1, 2, and 3 are turned off.

The host device 1 is constituted of a general-purpose computer system equipped with a processor and memory. A functional configuration, which will be described later, is operated by the host device 1 executing a predetermined computer program. Specifically, the host device 1 includes a printer driver 11, a scanner driver 12, a port monitor 13, a network interface section 15, and an application 19. The scanner driver 12 and the port monitor 13 have an address table 17 (17b, 17a), respectively.

Figure 2:
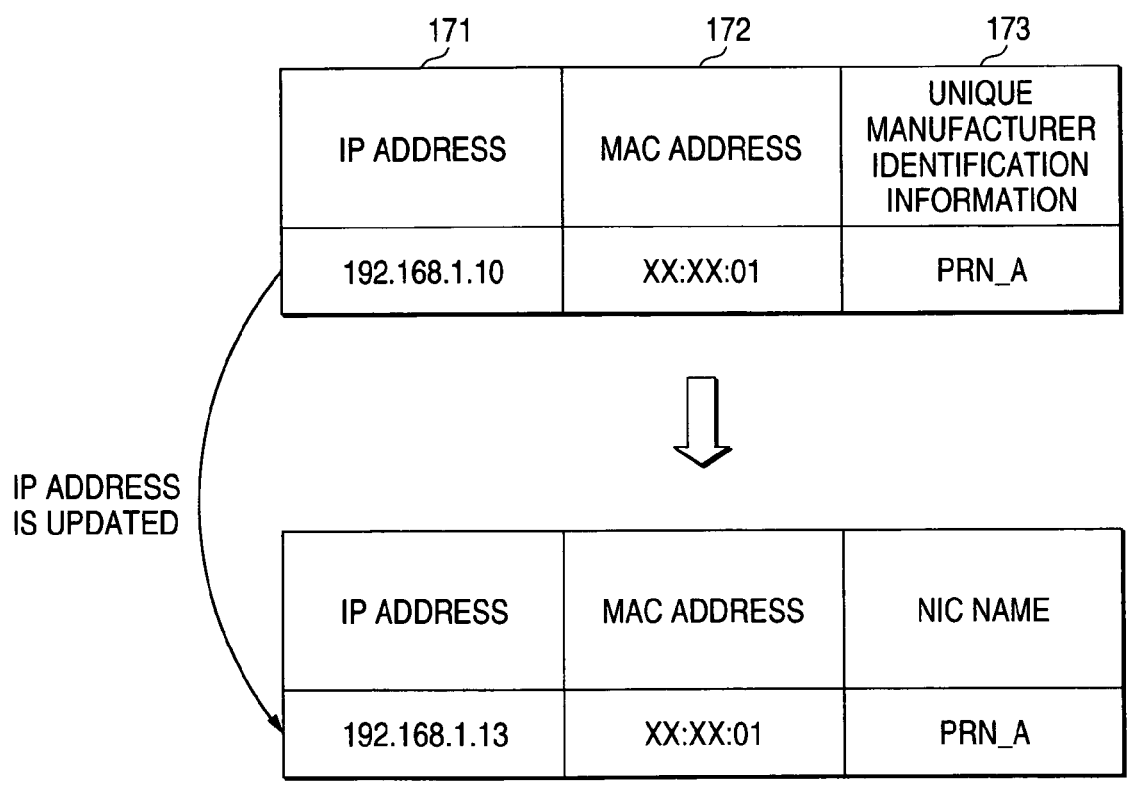
FIG. 2 shows a view showing an example of an address table 17 before and after updating.

Each of the address tables 17 stores address information pertaining to a device which will be a device in communication with the host device 1. In the present embodiment, address information about the printer 2 is stored in the address table 17a of the port monitor 13, and address information about the scanner 3 is stored in the address table 17b of the scanner driver 12. FIG. 2 shows one example of the address table 17a, and items of data are common to the address table 17b, as well. Specifically, each of the address tables 17 has, as items of data, an IP address 171, a MAC address 172, and unique manufacturer identification information 173. Only one of the MAC address 172 and the unique manufacturer identification information 173 may be acceptable as an item of data. As will be described later, in relation to the address table 17, the port monitor 13 and the scanner driver 12 perform registration and updating of the address tables 17a, 17b. FIG. 2 shows details of the address table 17 before and after update when a change in the IP address 171 of the printer 2 has been detected.

In response to a print request from the application 19, the printer driver 11 generates a print command for causing the printer 2 to effect printing. The thus-generated print command is delivered to the printer 2 through the port monitor 13 and the network interface section 15, whereupon printing is carried out.

In response to the request from the application 19, the scanner driver 12 causes the scanner 3 to read image data through control operation. Through the network interface section 15, the scanner driver 12 acquires the image data read by the scanner 3. The scanner driver 12 manages its own address table 17b.

The port monitor 13 exchanges data with the printer 2 through the network interface section 15. The port monitor 13 manages its own address table 17a.

The network interface section 15 exchanges data with another device connected to the network 9. For instance, the network interface section 15 performs control operation for establishing communication with another device connected to the network, by a TCP/IP protocol, a UDP/IP protocol, or a protocol other than these. Here, a protocol other than the TCP/IP or the UDP/IP protocol is a communication protocol unique to a manufacturer, which has prepared a protocol for establishing communication between a peripheral device of the manufacturer and a host device of that peripheral device. For instance, the network interface section 15 acquires, from the device of the network which will be a party in communication with the host device 1, an IP address assigned thereto, a MAC address of the device, and identification information unique to the manufacturer by using the communication protocol unique to the manufacturer. Registration or updating of the data in the address table 17 is performed on the basis of the thus acquired information. Details on the function of the port monitor for managing the address of the printer 2 will be described hereunder, and the scanner driver 12 also manages the address of the scanner 3 in the same manner.

For instance, the port monitor 13 commands the network interface section 15 to detect a peripheral device connected to the network 9, such as a printer. Upon receipt of the command, the network interface section 15 broadcasts an inquiry command to be used for detecting a communicable device through the network by utilization of the unique manufacturer protocol. In the embodiment, the printer 2 and the scanner 3, which are connected to the network, receive this inquiry command. In response to this command, the printer 2 and the scanner 3 send back a predetermined response message to this command.

The port monitor 13 receives the response messages output from the printer 2 and the scanner 3. The response messages include information about the printer 2 and the scanner 3; e.g., a MAC address, unique manufacturer identification information, and an IP address assigned at a point in time when the response message is returned, all being assigned to each of the devices. For instance, the IP address may be included in a header portion of this response message, and the MAC address and the unique manufacturer identification information may be included in the main body portion of this response message. When the port monitor 13 receives the response message, a record consisting of an IP address 171, a MAC address 172, and unique manufacturer identification information 173 is additionally registered in the address table 17. At this time, it may be the case that only the peripheral device determined as a printer on the basis of the MAC address 172 or the unique manufacturer identification information 173 is registered in the address table 17. When a record having the same MAC address 172 or unique manufacturer identification information 173 already exists in the same record of the address table 17, the IP address 171 of the registered record is updated by taking, as a key, the MAC address 172 or the unique manufacturer identification information 173. As a result, even when the IP address of the peripheral device has been changed, the change can be reflected in the address table 17a.

Processing procedures of the network system having a configuration, such as that mentioned above, will now be described by reference to flowcharts shown in FIGS. 3 and 4. In a first processing pattern shown in FIG. 3 and a second processing pattern shown in FIG. 4, there is described processing to be performed before transmission of print data to the printer 2 when the print request is received from the application 19. Even when a command output from the application 19 to the scanner 3 has been received, similar processing is performed before a command is issued to the scanner 3.

Figure 3:
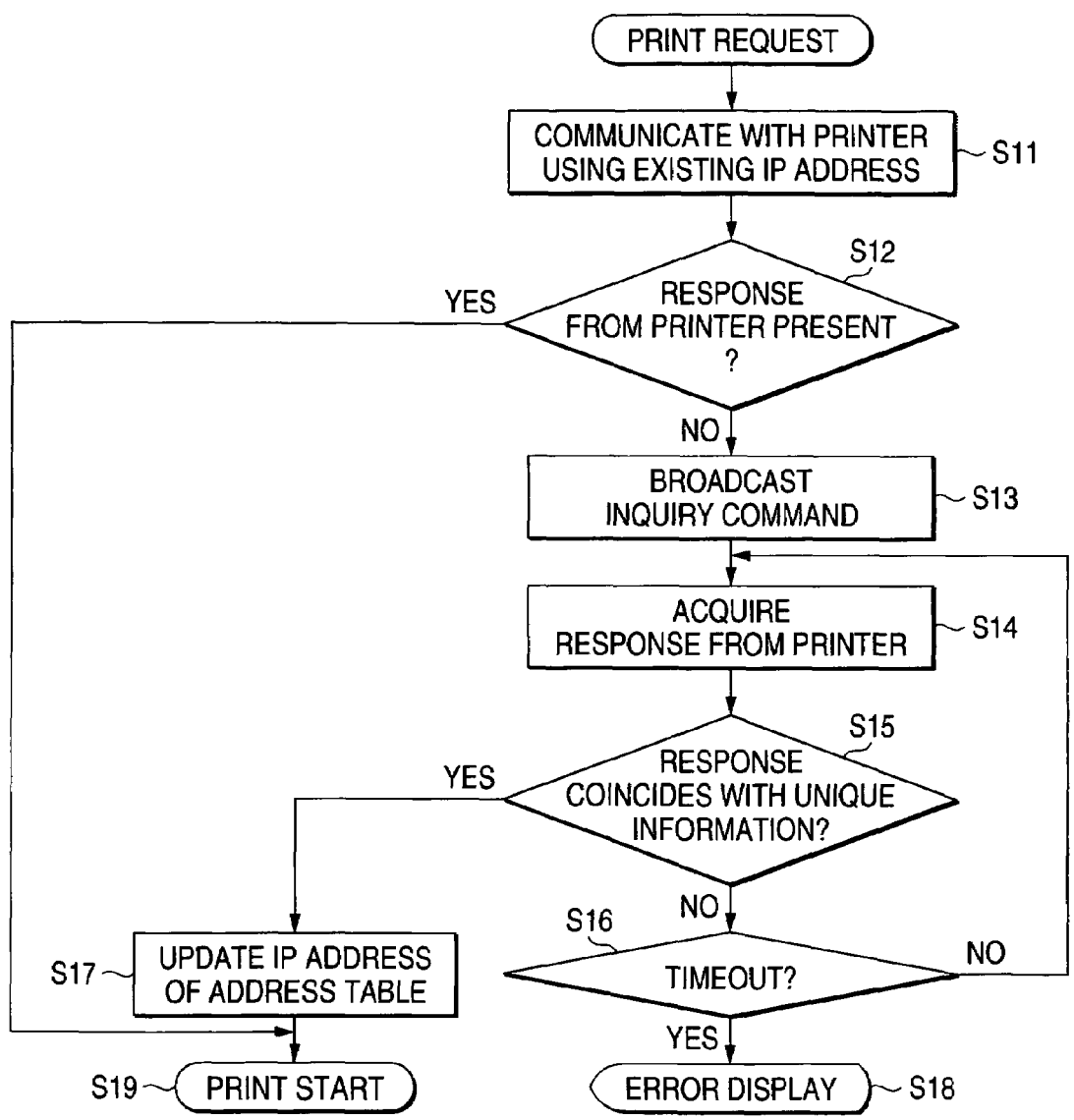
FIG. 3 shows a flowchart showing processing procedures of the network system according to the embodiment.

In the first processing pattern shown in FIG. 3, the port monitor 13 commands the network interface section 15 to ascertain whether or not the interface can communicate with the printer 2, by using the IP address 171 of the printer 2 registered in the address table 17a. The network interface section 15 transmits a ping command, or a like command, to the instructed IP address, thereby ascertaining whether or not communication can be established with the printer 2 by using a TCP/IP or a UDP/IP protocol (S11).

Here, when a response is returned from the printer 2 and communication can be established with the printer 2 by use of the TCP/IP or UDP/IP protocol (YES in S12), the printer driver 11 generates print data, as usual, and transmits the print data to the printer 2, where printing is effected (S19).

When no response is returned from the printer 2 (NO in S12), the network interface section 15 broadcasts an inquiry command for detecting a device which is communicable by means of a protocol unique to the manufacturer, in accordance with the command from the port monitor 13 (S13).

Upon receipt of the broadcast command, the printer 2 sends back a response message including a MAC address, unique manufacturer identification information, and an IP address assigned at this point in time, and the host device 1 receives the message (S14).

Upon receipt of the response message, the port monitor 13 retrieves the address table 17 while taking, as a key, the MAC address or the unique manufacturer identification information, both being included in the received response message, thereby determining whether or not there exists a record whose MAC address or unique manufacturer identification information coincides with the key (S15). When no coincident record is found as a result of determination (NO in S15), processing returns to step S14 and is continually performed until a timeout arises (S16). When a timeout has arisen, an error message is output, and processing is terminated (S18).

When a record whose MAC address or unique manufacturer identification information coincides with the key is found as a result of determination made in step S15 (YES in S15), an IP address included in the response message is written over the IP address 171 of that record, thereby updating the IP address 171 (S17). The print data generated by the printer driver 11 using the updated IP address are transmitted, and printing is effected (S19). Even when the IP address-assigned to the printer 2 is changed, the change is detected, to thus update the address table 17 as shown in FIG. 2 by means of execution of such processing. Consequently, printing can be carried out by utilization of the updated IP address.

Figure 4:
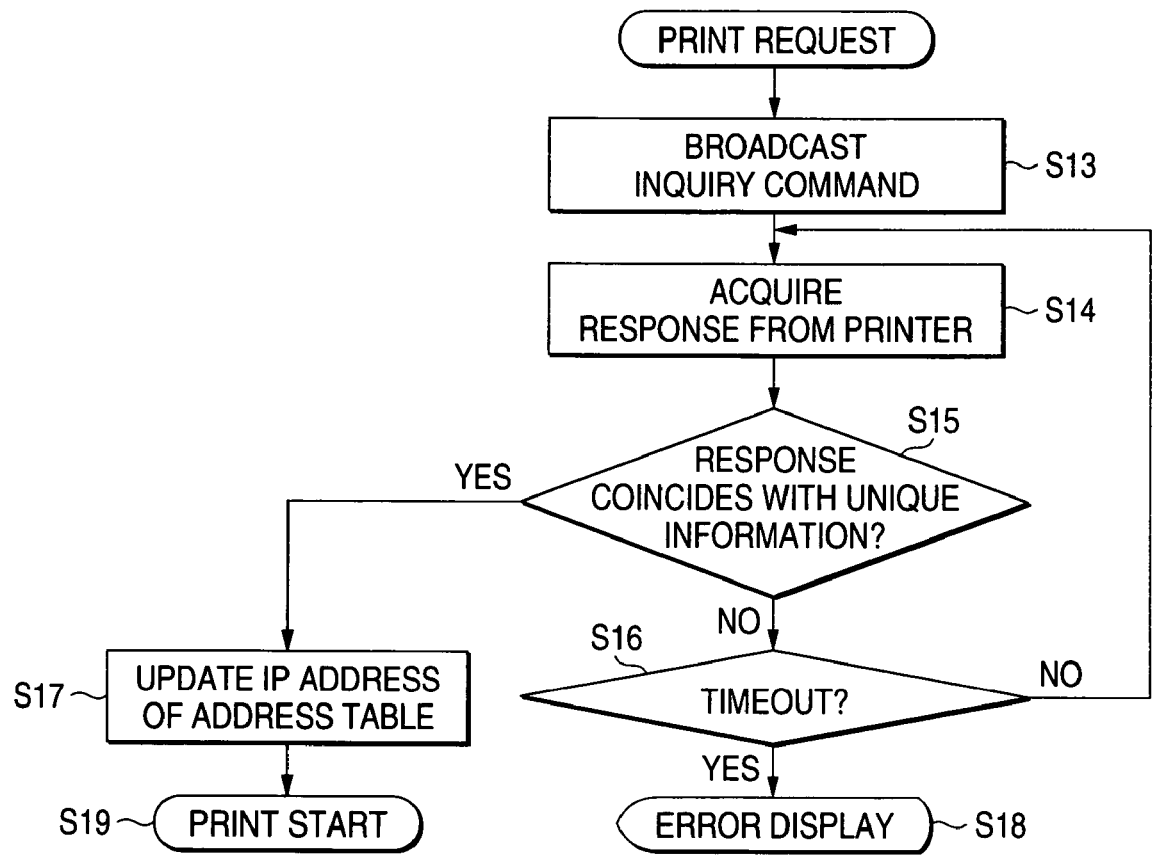
FIG. 4 shows a flowchart showing processing procedures of the network system according to the embodiment.

The second processing pattern shown in FIG. 4 is a modification of the first processing pattern. Specifically, according to the first processing pattern, communication with the IP address of the previously-registered printer 2 is ascertained beforehand. An inquiry command is issued solely when communication cannot be carried out, thereby updating the address table 17. In contrast, according to the second processing pattern, an inquiry command is inevitably issued before printing is performed without checking communication beforehand, thereby updating the address table 17.

As shown in FIG. 4, the second processing pattern corresponds to the first processing pattern from which steps S11, S12 are omitted. As a result, upon receipt of the print request, the IP address of the printer 2, which is available at that point in time, is acquired before every transmission of the print command. Hence, the host device 1 can ascertain the latest IP address of the printer 2 at all times The previously-described embodiment is a mere illustration for describing the present invention and is not intended to limit the scope of the invention solely to the embodiment. A person skilled in the art can practice the present invention in various other forms without departing from the gist of the invention.

For instance, a case where one printer and one scanner are connected to the network has been described as one example of the arrangement of peripheral devices. However, the number of printers and the number of scanners may be two or more. Moreover, an arbitrary peripheral device, such as an external storage device, may be connected in place of the printer and the scanner or in addition to the printer and the scanner. The device whose IP address is to be changed may be a device other than a peripheral device. For example, even when the device is another host device connected to the network, processing can be performed in the same manner as in the case of the embodiment.

In addition to the case where the host device acquires, as appropriate, an IP address from a peripheral device as in the case of the embodiment, when an IP address is assigned to a peripheral device, the peripheral device may spontaneously effect broadcasting or specify the destination of transmission with regard to another device of the network, thereby reporting an IP address and a MAC address. Further, such a spontaneous report may be periodically issued while the peripheral device is connected to the network.

Although the MAC address and the unique manufacturer identification information are used as information unique to the peripheral device, unique information other than those pieces of information may be used, so long as the information enables discrimination of devices from each other.

What is claimed is:

1. A host device connected to a network, comprising:
a storage unit configured to store first identification information dynamically assigned to a device connected to the network and second identification information unique to the device;
an updating unit acquiring the first identification information and the second identification information from the device and updating the first identification information stored in the storage unit with the acquired first identification information based on the acquired second identification information; and
a communication unit configured to communicate with the device by using the first identification information stored in the storage unit,
wherein:
the updating unit determines whether the second identification information stored in the storage unit corresponds with the acquired second identification information,
the updating unit updates the first identification information stored in the storage unit with the acquired first identification information based on a result of the determination, and
when the communication unit fails to communicate with the device, the updating unit acquires the first identification information and the second identification information from the device and updates the first identification information stored in the storage unit with the acquired first identification information based on the acquired second identification information.

2. A host device connected to a network, comprising:
a storage unit configured to store first identification information dynamically assigned to a device connected to the network and second identification information unique to the device;
an updating unit acquiring the first identification information and the second identification information from the device and updating the first identification information stored in the storage unit with the acquired first identification information based on the acquired second identification information; and
a communication unit configured to communicate with the device by using the first identification information stored in the storage unit, wherein:

the updating unit determines whether the second identification information stored in the storage unit corresponds with the acquired second identification information, the updating unit updates the first identification information stored in the storage unit with the acquired first identification information based on a result of the determination, and before the communication unit communicates with the device, the updating unit acquires the first identification information and the second identification information from the device and updates the first identification information stored in the storage unit with the acquired first identification information based on the acquired second identification information.

3. A host device connected to a network, comprising:

a storage unit configured to store first identification information dynamically assigned to a device connected to the network and second identification information unique to the device;

an updating unit acquiring the first identification information and the second identification information from the device and updating the first identification information stored in the storage unit with the acquired first identification information based on the acquired second identification information; and a communication unit configured to communicate with the device by using the first identification information stored in the storage unit, wherein:

the updating unit determines whether the second identification information stored in the storage unit corresponds with the acquired second identification information, the updating unit updates the first identification information stored in the storage unit with the acquired first identification information based on a result of the determination the communication unit communicates with the device through first protocol by using the first identification information; and the updating unit acquires the first identification information and the second identification information from the device through second protocol that differs from the first protocol.

4. The host device according to claim 3, wherein:

the first protocol includes a TCP/IP or a UDP/IP; and the second protocol includes a manufacturer unique protocol.

\* \* \* \* \*